UNITED STATES PATENT OFFICE.

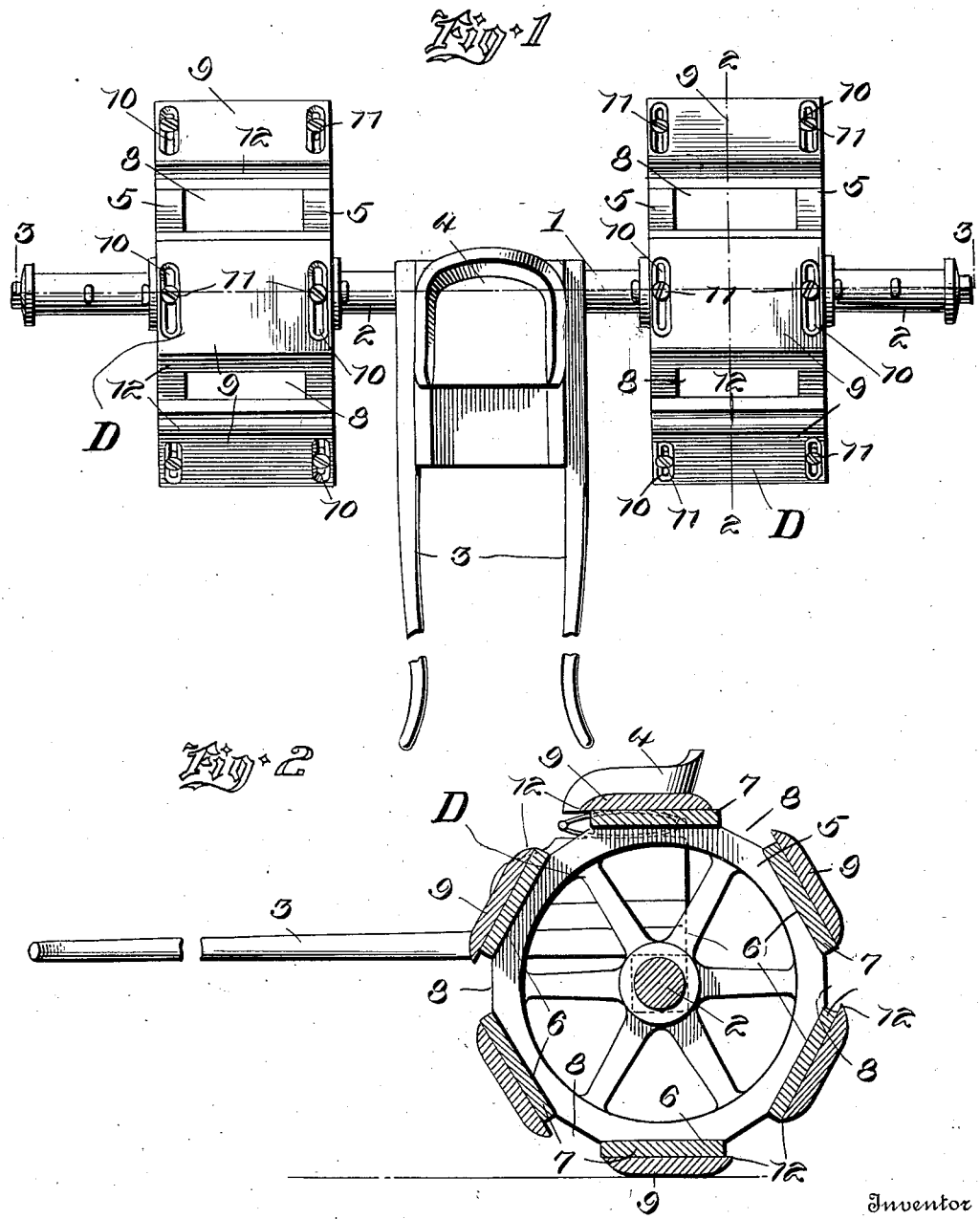

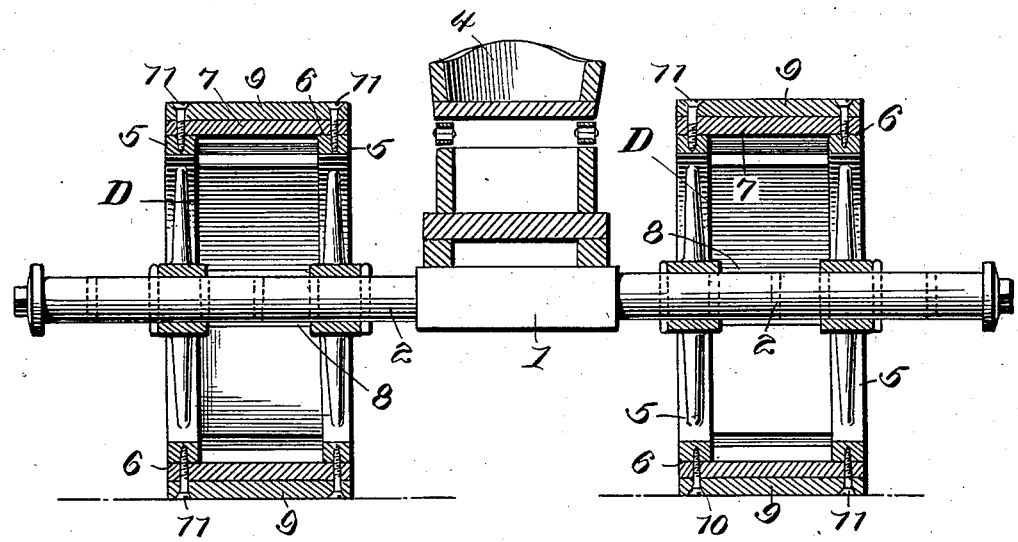
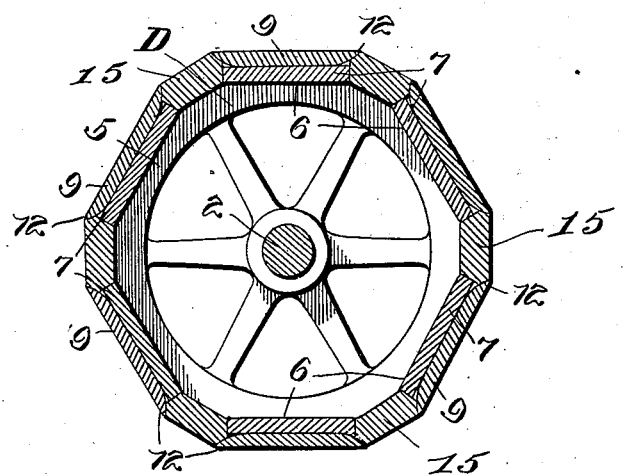

JAMES N. BURTON, OF ATLANTA, GEORGIA.

COTTON-CHOPPER.

1,011,738.  Specification of Letters Patent.  Patented Dec. 12, 1911.

Application filed April 18, 1911. Serial No. 621,890.

*To all whom it may concern:*

Be it known that I, JAMES N. BURTON, a citizen of the United States, residing at Atlanta, in the county of Fulton and State of Georgia, have invented new and useful Improvements in Cotton-Choppers, of which the following is a specification.

This invention relates to cotton choppers and it has for its object to produce a device of simple and improved construction which may be conveniently and efficiently utilized for the purpose of chopping out cotton and similar crops in which it is necessary to destroy the superfluous plants and to leave stands of plants at suitable distances apart in the row.

A further object of the invention is to produce a device of the character described which, by the reversal of the chopping members and the introduction of spacing devices, may be converted into a land roller for the purpose of rolling wheat and other crops and crushing and pulverizing the soil.

With these and other ends in view which will readily appear as the nature of the invention is better understood, the same consists in the improved construction and novel arrangement and combination of parts which will be hereinafter fully described and particularly pointed out in the claims.

In the drawings hereto annexed has been illustrated a simple and preferred form of the invention; it being, however, understood that no limitation is necessarily made to the precise structural details therein exhibited, but that changes, alterations and modifications within the scope of the appended claims may be resorted to when desired.

In the drawings: Figure 1 is a top plan view of a cotton chopper constructed in accordance with the invention, the same being adapted for operation upon two rows of plants. Fig. 2 is a transverse sectional view taken on the line 2—2 in Fig. 1. Fig. 3 is a longitudinal sectional view taken on the line 3—3 in Fig. 1. Fig. 4 is a sectional view taken through one of the drums and showing the same adapted to serve as a land roller.

Corresponding parts in the several figures are denoted by like characters of reference.

The improved device comprises an axle member 1 having spindles 2, 2 upon which the drums D are supported for rotation. Thills or shafts 3 for the attachment of the draft animal are connected with the axle member 1 which also supports a seat 4 for the driver or operator.

Each of the drums D is composed of two side members 5 of polygonal shape, each of said side members being provided with any desired number of faces 6 upon which the plates or spacing members 7 are secured, thereby connecting the side members 5, 5. Between the spacing members 7 are open spaces 8 which may be of any desired width. The number of the spacing members may be varied according to the dimensions of the machine.

Slidably mounted upon each of the spacing members 7 is a blade or cutting member 9 having slots 10 for the reception of fastening members, such as clamping bolts 11, whereby the said blades are adjustably secured in position. Each blade is provided at the front and rear edges thereof with beveled cutting edges 12, and it will be understood that when one of said edges becomes dull, the blade may be reversed end for end so as to expose the other edge.

It will be readily seen that by properly adjusting the blades 9 the forward cutting edge may be permitted to overhang the forward edge of the spacing member upon which such blade is mounted, and to project any desired distance over the intermediate space 8 between the spacing member upon which the blade is mounted and the one next in front. By such adjustment of the blades, the size of the stands that are left when the device is in operation may be accurately gaged and regulated, as will be readily understood.

By reversing the blades 9 so as to present the beveled portions 12 in the direction of the spacing members, and by introducing filling members 15 of suitable shape into the spaces 8 which are ordinarily left vacant, a drum having a solid circumference may be produced, as shown in Fig. 4 of the drawings which may be effectively utilized as a land roller and pulverizer.

The improved device, as will be seen from the foregoing description, taken in connection with the drawings hereto annexed, is simple in construction, and it has been found to be thoroughly efficient for the purposes for which it is provided.

Having thus described the invention, what is claimed is:

1. In a cotton chopper, a drum supported for rotation, said drum being composed of polygonal side members, spacing members secured upon the faces of the side members, said spacing members being suitably spaced apart to leave intermediate spaces between their proximate edges, transversely slotted blades having beveled front and rear edges, and fastening members engaging the slots whereby the blades are adjustably mounted upon the spacing members.

2. In a device of the character described, a drum comprising polygonal side members and spaced connecting members mounted upon the faces thereof, reversible blades engaging the connecting members and having transverse slots, said blades having their edges beveled on one side, fastening members engaging the slots to permit the blades to be adjusted and reversed and filling members engaging the spaces between the connecting members and retained by the overhanging beveled edges of the blades.

In testimony whereof I affix my signature in presence of two witnesses.

JAMES N. BURTON.

Witnesses:
T. J. WUNLEISH,
D. A. BYNUM.

Copies of this patent may be obtained for five cents each, by addressing the "Commissioner of Patents, Washington, D. C."